(12) United States Patent
Ozluturk

(10) Patent No.: US 8,116,238 B2
(45) Date of Patent: *Feb. 14, 2012

(54) PLURAL NETWORK PROTOCOL WIRELESS TRANSMIT/RECEIVE UNIT

(75) Inventor: Fatih M. Ozluturk, Port Washington, NY (US)

(73) Assignee: InterDigital Technology Corporation, Wilmington, DE (US)

(*) Notice: Subject to any disclaimer, the term of this patent is extended or adjusted under 35 U.S.C. 154(b) by 926 days.

This patent is subject to a terminal disclaimer.

(21) Appl. No.: 12/115,275

(22) Filed: May 5, 2008

(65) Prior Publication Data

US 2008/0214232 A1 Sep. 4, 2008

Related U.S. Application Data

(63) Continuation of application No. 11/000,286, filed on Nov. 30, 2004, now Pat. No. 7,369,573.

(60) Provisional application No. 60/570,567, filed on May 13, 2004.

(51) Int. Cl.
*H04B 7/005* (2006.01)

(52) U.S. Cl. ...................................... 370/278

(58) Field of Classification Search .................. 370/328, 370/469, 278; 455/552, 436, 438
See application file for complete search history.

(56) References Cited

U.S. PATENT DOCUMENTS

| | | | |
|---|---|---|---|
| 5,867,764 | A | 2/1999 | Williams |
| 6,957,086 | B2 | 10/2005 | Bahl et al. |
| 6,993,476 | B1 | 1/2006 | Dutta et al. |
| 7,171,206 | B2 * | 1/2007 | Wu .............................. 455/438 |
| 2003/0118015 | A1 | 6/2003 | Gunnarsson et al. |
| 2003/0231586 | A1 * | 12/2003 | Chheda ......................... 370/230 |
| 2005/0064862 | A1 | 3/2005 | Castrogiovanni et al. |
| 2005/0149531 | A1 | 7/2005 | Srivastava |
| 2005/0157750 | A1 | 7/2005 | Rabie et al. |
| 2005/0169279 | A1 | 8/2005 | Magd et al. |
| 2005/0288046 | A1 | 12/2005 | Zhao et al. |

FOREIGN PATENT DOCUMENTS

| | | |
|---|---|---|
| GB | 2 330 729 | 4/1999 |
| WO | 98/57482 | 12/1998 |
| WO | 02/13462 | 2/2002 |

OTHER PUBLICATIONS

Lauterbach et al. "Using DAB and GSM to Provide Interactive Multimedia Services to Portable and Mobile Terminals", Lecture Notes in Computer Science, vol. 1242, May 1997, pp. 593-607.
Tachikawa, "W-CDMA Mobile Communication System," Maurzen Co., Ltd. pp. 176 and 180 (Jun. 25, 2001).

* cited by examiner

*Primary Examiner* — Hassan Phillips
*Assistant Examiner* — Prenell Jones
(74) *Attorney, Agent, or Firm* — Volpe and Koenig, P.C.

(57) ABSTRACT

A wireless transmit/receive unit (WTRU) communicates in a system which includes plural network protocols. The WTRU includes a circuit configured to make an initial communication request. A communication circuit establishes a communication link in response to the initial communication request in a first direction of communication and a second direction of communication. Circuitry determines a protocol preference for the first direction of communication and to establish communication in the first direction according to the protocol preference separately from communication in the second direction of communication. Circuitry determines a protocol preference for the second direction of communication and to establish communication in the second direction according to the protocol preference separately from communication in the first direction of communication. A circuit determines the availability of communication services optimal for communicating the user data in a different protocol from the protocol used as the communication link.

12 Claims, 4 Drawing Sheets

PLURAL NETWORK PROTOCOL WIRELESS TRANSMIT/RECEIVE UNIT

CROSS REFERENCE TO RELATED APPLICATION(S)

This application is a continuation of U.S. patent application Ser. No. 11/000,286 filed on Nov. 30, 2004, which claims the benefit of U.S. Provisional Application No. 60/570,567 filed on May 13, 2004, which are incorporated by reference as if fully set forth.

FIELD OF INVENTION

The present invention relates to wireless networks and more particularly to delivering services to wireless terminals capable of supporting multiple radio interfaces and network infrastructures.

BACKGROUND

Wireless systems currently in use are mainly voice services based. Supplemental services such as short message service (SMS), multimedia messaging service (MMS), instant messaging service (IMS) and the like have been deployed over wireless systems and generate significant revenues for the operators. This is complicated by the fact that these services are closely tied to specific technologies and network infrastructure and users may not be able to reach these services by way of another wireless access technology other than the one supported by the user's terminal.

The integration of WLAN and other such networks into existing wireless (such as cellular) networks makes delivery to multiple interfaces advantageous. The existing wireless networks include general packet radio service (GPRS), universal mobile telecommunication system (UMTS), code division multiple access 2000 (CDMA 2000) to name just a few, together with the variety of wireless terminals that can support such technologies. The multiple networks make it advantageous to provide for independent delivery of such services to wireless terminals capable to supporting multiple radio interfaces and network infrastructures.

The IEEE 802.11 communications protocol allows a client to roam among multiple access points that may be operating on the same or separate channels. IEEE 802.11 communications are generally effected through wireless LAN access points (APs), which are typically single standalone units, but can include networks with multiple APs which provide a roaming function. To support the roaming function, each access point typically transmits a beacon signal every 100 ms. A roaming station (STA) uses the beacon to gauge the strength of its existing access point connection. If the STA senses a weak signal, the roaming STA can implement the reassociation service to connect to an access point emitting a stronger signal. In addition to IEEE 802.11, there are other "802" series protocols, such as IEEE 802.16, IEEE 802.20 as well as similar protocols which do not follow an IEEE "802" standard.

In multiple mode systems, a selection is made of a radio access technology (RAT) in a system which includes at least two networks having different RAT capabilities compatible with the RAT capabilities for communicating with a wireless transmit/receive unit (WTRU) having multiple RAT capabilities.

Accordingly, it is desirable to more effectively utilize the capabilities of multi-mode terminal.

SUMMARY

A wireless transmit/receive unit (WTRU) that communicates in a system which includes plural network protocols is disclosed. The WTRU includes a circuit configured to make an initial communication request. A communication circuit establishes a communication link in response to the initial communication request in a first direction of communication and a second direction of communication. Circuitry determines a protocol preference for the first direction of communication and to establish communication in the first direction according to the protocol preference separately from communication in the second direction of communication. Circuitry determines a protocol preference for the second direction of communication and to establish communication in the second direction according to the protocol preference separately from communication in the first direction of communication. A circuit determines the availability of communication services optimal for communicating the user data in a different protocol from the protocol used as the communication link.

DETAILED DESCRIPTION OF THE PREFERRED EMBODIMENTS

Figure 1:
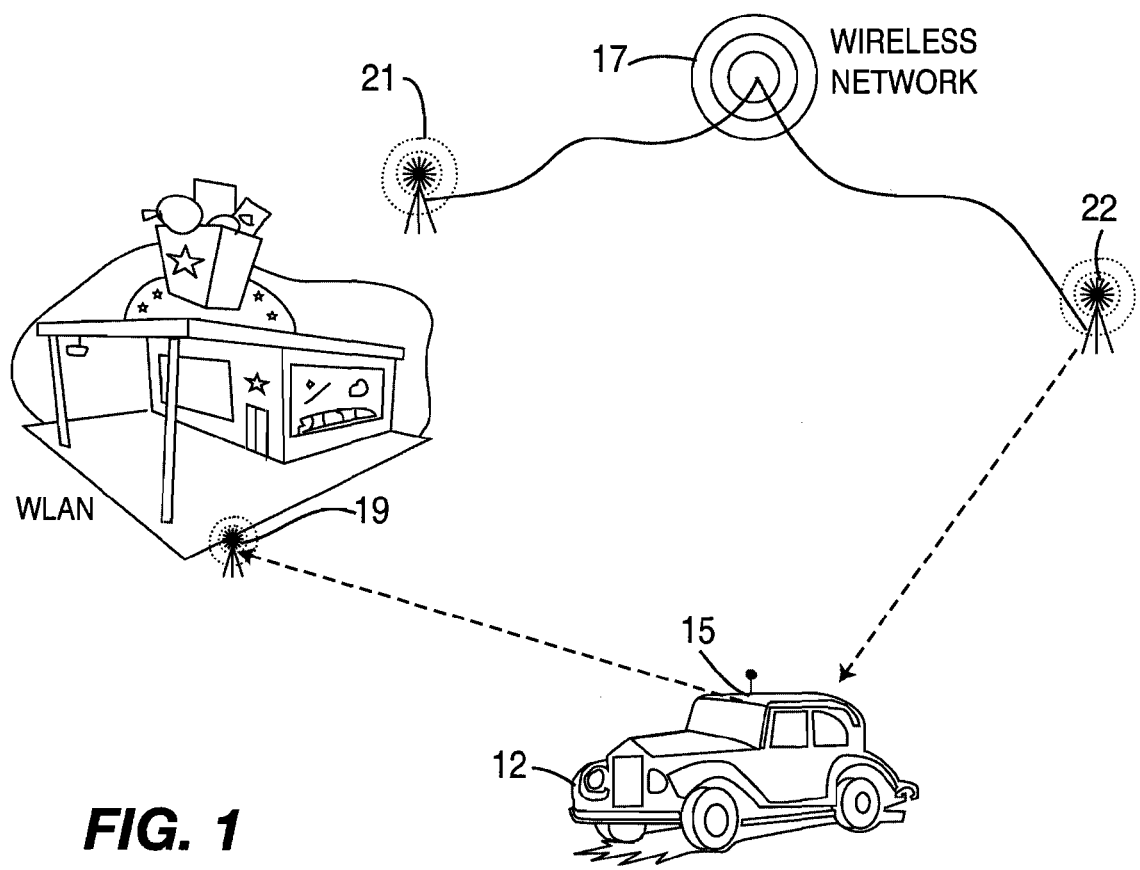
FIG. 1 is a diagram of a simplified wireless network environment using at least one base station (BS) and at least one access point (AP).

This invention relates to selection of the mode (air interface) for forward and reverse links independently in a multi-mode terminal. In other words, the present invention proposes that the forward and reverse links be established over different modes if it is preferable. For instance, according to the present invention, a terminal could be receiving a forward link over wireless local area network Wireless Local Area Network (WLAN) air interface and transmitting a reverse link over to Universal Mobile Telecommunications Service (UMTS) UMTS air interface.

Although the features and elements of the present invention are described in the preferred embodiments in particular combinations, each feature or element can be used alone (without the other features and elements of the preferred embodiments) or in various combinations with or without other features and elements of the present invention.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station (BS) includes but is not limited to a Node B, site controller, access point or any other type of interfacing device in a wireless environment. An "access point" (AP) is a station or device which provides a wireless access for devices to establish a wireless connection with a LAN, and establishes a part of a wireless LAN (WLAN). If the AP is a fixed device on a WLAN, the AP is a station which transmits and receives data. The AP permits connection of a WTRU to a network, provided that the WLAN itself has a connection to the network.

In describing digital wireless services, there is a distinction to be made between carrier data and user data. "Carrier data" includes data used for control radio link-related functions, such as power control, handoffs and channel assignments. "User data" includes functions related to the user, including control functions not directly related to the radio link, as well as voice and data intended for the user or a device but not used to establish or maintain a radio link. "User" is intended to include functions not related to the radio link, which sometimes affect components not directly accessed by the user, such as device control not related to the radio link. The preceding is not intended to be definitive; but rather to distinguish between carrier data and user data.

Multi-mode terminals are able to select one mode or another for transmission and reception based on user preferences, network settings, availability of bandwidth, etc. Typically, multi-mode terminals have the ability to allow them to use one mode or another for communications.

In the preferred embodiments, a WTRU such as a multi-mode terminal is able to select one mode or another for transmission and reception based on user preferences, network settings, availability of bandwidth, etc., with an ability to effect the selection in different modes for forward and reverse links independently. The forward and reverse links have the option to use different air interfaces in a multi-mode terminal. This increases the overall air interface efficiency, and gives the ability to do traffic load management over two modes and networks.

Preferably, the network is capable of forming and relating two different air interfaces and call functions. The terminal is capable of using different of its modes for forward and reverse links. The physical layers for the uplink and downlink are modified in accordance with the modes used in the respective links.

FIG. 1 is a diagram of a simplified wireless network environment. As depicted, the user WTRU 15 is able to establish radio links with a cellular type wireless network 17 or other cellular network, and with a "hot spot" 19. The cellular network 17 includes one or more base stations 21, 22, and the user's link with the cellular network 17 is generally with one of the base stations 22 selected according to network control protocols. The "hot spot" (WLAN) 19 is generally a high data rate connection, such as an IEEE 802 series access point (AP), or may be any other convenient protocol. The WTRU 15 can connect with either the cellular network 17 or the "hot spot" 19 for any given communication, provided that the user is within range.

Figure 2:
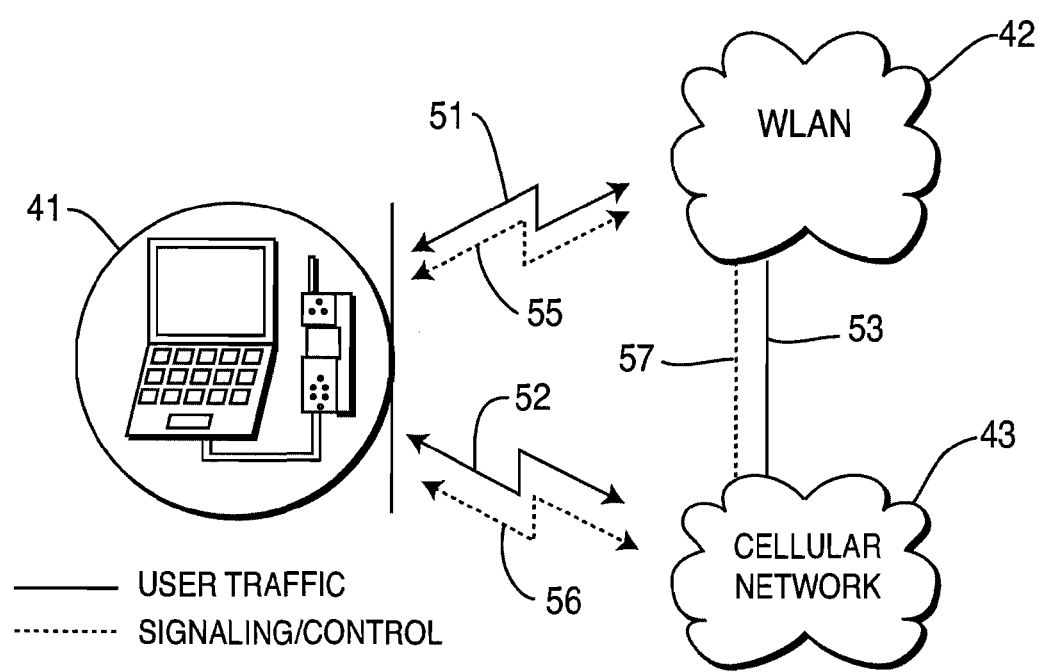
FIG. 2 is a diagram showing representations of radio communication links established to connect a WTRU with a WLAN and a cellular network.

FIG. 2 is a diagram showing representations of radio communication links established to connect a WTRU 41 with a WLAN 42 and a cellular network 43. The communication includes user data 51-53 and control data 55-57. In the case of the WTRU 41 communicating solely with one of the networks, such connection links 51,55 between the WTRU 41 and the WLAN 42. Control and signaling is generally executed through the same link with the WTRU 41 as the user data (links 51 and 55 in the cited example) even if the user data or control data originates from elsewhere, as represented by network data links 53, 57.

According to the present invention, the user data connections 51, 52 between the WTRU 41 and the other network components 42, 43 can be separately selected for each direction for each connection 51, 52. As a result, it is possible to select user data connections 51,52 between the WTRU 41 and the other network components 42, 43 which are optimum for each direction of a particular connection 51, 52. The links are completed by data links 53, 57 between the network components 42,43. The control signals can be communicated through one or both of the control links 55, 56, using communication of control data 57 between network components 42, 43. As a result, the user has an option when using a multimode terminal in that, if the user has access to more than one service, the user has the option to receive or send from the different services, according to a selection criterion. The selection can be made by WTRU 41, the network or directly by the user.

While two network components 42,43 are shown directly communicating, it is anticipated that communications can be performed indirectly, through other components.

Referring again to FIG. 1, according to the present invention, the WTRU 15 may establish separate communication links in the forward and reverse directions in order to optimize communications. In the depicted example, the WTRU 15 has established a communication link with "hot spot" 19 for the uplink and with base station 22 for the downlink. In the depicted circumstance, this provides a capability of high data volume transfer for the uplink to the hot spot 14, but allows the downlink to operate through the base station 22. This has the advantages of providing for high volume data transfer in the uplink while allowing downlink user data transfer at a slower rate but perhaps in a more reliable fashion. An example of high volume data would be a video camera (not separately shown), which provides real time images. If the user data includes voice and other data, the connection with base station 22 provides a more reliable communication where data volume (bandwidth) is deemed to be unimportant.

A connection is effected between the WTRU 15 and a user with a video connection. The real time images from the WTRU 15 are transported in an uplink via the "hot spot" 19, which provides an IEEE 802.11 service. The "hot spot" 19 is selected for its availability and the ability for the 802.11 to efficiently carry video data. Most of the downlink communication of user data is audio and the service for the downlink is via a cellular connection through base station 22 and is optimized for audio. It is possible to use the 802.11 link 15 for the downlink; however this would present the user with the disadvantages of 802.11 for audio services without any need for transfer of large amounts of user data. Thus for the downlink the WTRU 15 uses the audio channel through base station 22, which optimizes the audio connection but in the uplink through "hot spot" 19 is optimal for the video connection. This has been described to illustrate the different requirements for uplink and downlink, and how the current invention serves them. Other scenarios are possible where requirements on the uplink and downlink may be reversed, or otherwise different.

Figure 3:
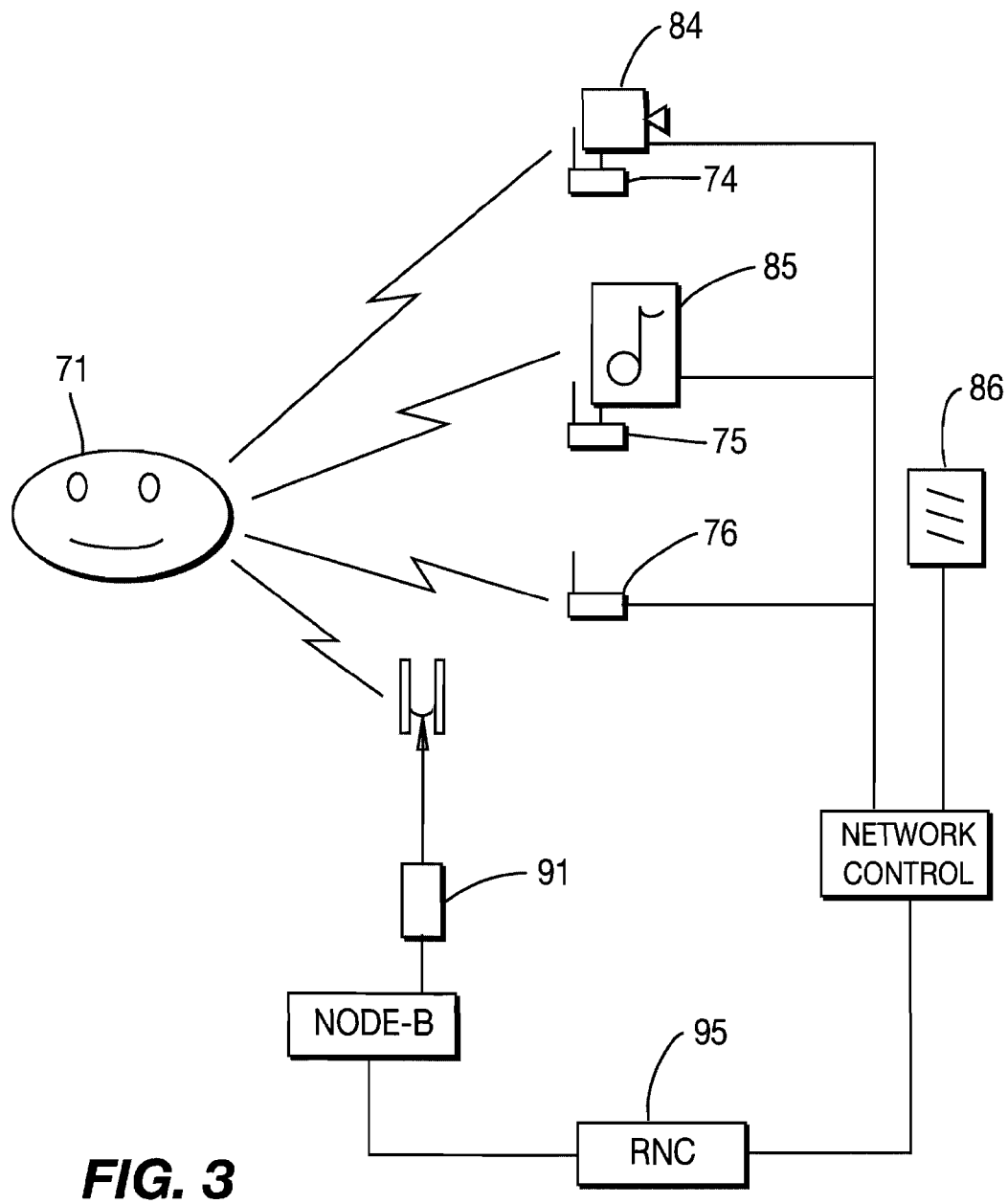
FIG. 3 is a diagram of user communication links.

FIG. 3 is a diagram of user communication links. As represented by the figure, a user of a WTRU 71 is able to connect directly or indirectly with a user data source through access points (APs) 74-76. The user data sources are depicted as video camera 84, music site 85, or other data site for upload or download 86. The user data sources may be connected to the AP through a LAN or accessed indirectly. The user data sources may also be associated directly with the WTRU 71. The data can also be transferred to remote locations such as a recipient's system (not separately shown) addressed through the network or otherwise. The control signals from the user as user data (not the network interface control) are transported through one of the APs 74-76 or through an audio channel at base station 91 operating through radio network controller 95. The base station 91 provides optimal continuous reception but without using large amounts of bandwidth. The downlink is the user data from the data source and is provided by a broadband connection. This affords maximum user data transfer, permitting the efficient use of bandwidth to provide the desired digitized user data to the user. The communication by the user 71 may be split in the forward and reverse directions so that links to different APs 74-76 or base stations 91 are used in each direction. Referring back to FIG. 2, network control communications can be effected through one or both of the forward and reverse links.

Figure 4:
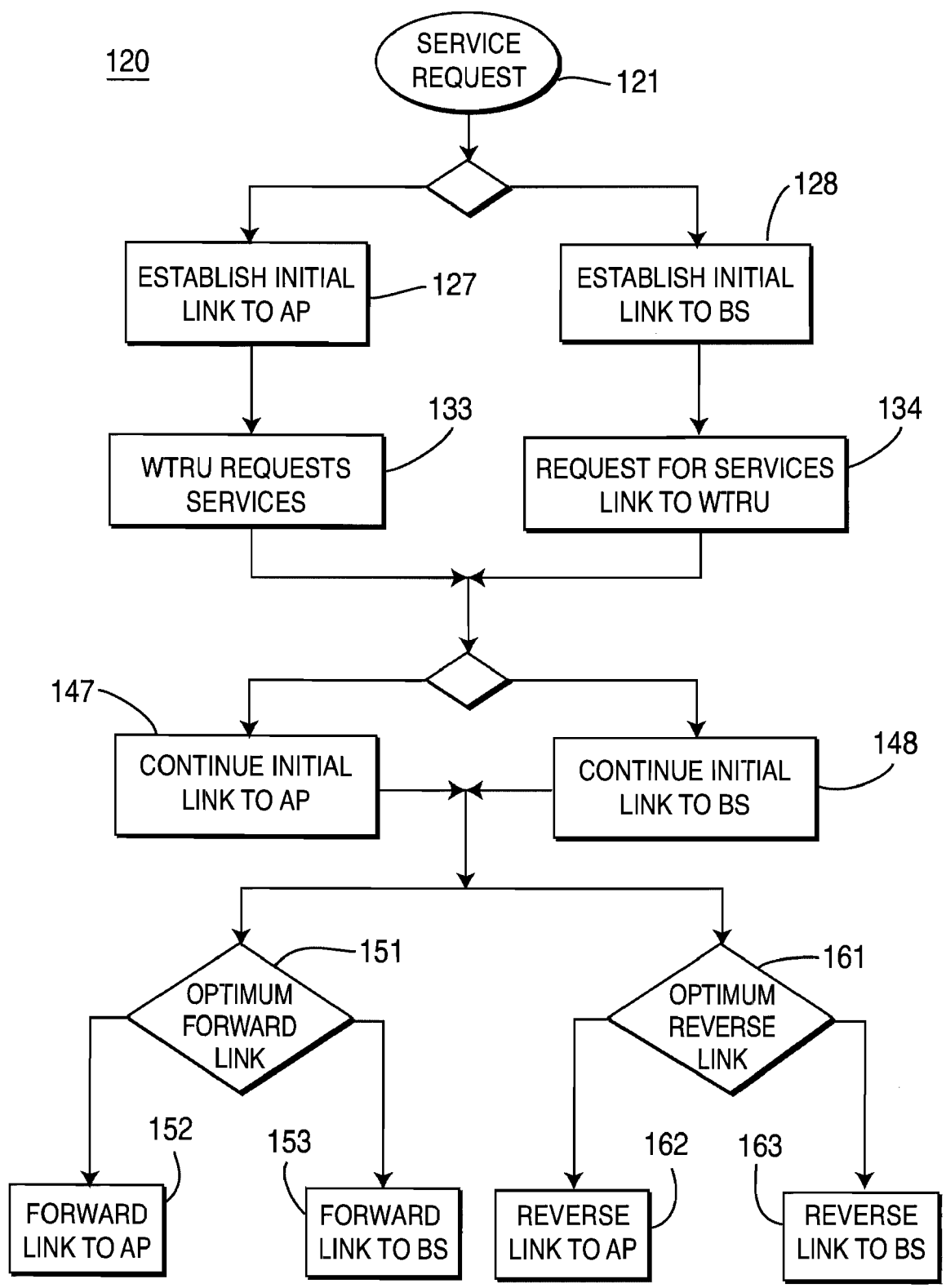
FIG. 4 is a flow diagram showing the determination of services used for forward and reverse links according to the present invention.

FIG. 4 is a flow diagram 120 which generically depicts the determination of services used for forward and reverse links (downlink and uplink, respectively). The service is requested (step 121) followed by the establishment of a link to either an AP (step 127) or a BS (step 128). A data event occurs when the WTRU requests services (step 133) or a request for services to the WTRU is made externally (step 134). In either case, the initial link is continued (steps 147, 148). The request for services either includes a request for a particular communication link or the preferred link is inherent in the service request itself. A determination is made (step 151) as to the optimum forward link, and the forward link is made to an AP (step 152) or to a BS (step 153). A determination is made (step 161) as to the optimum reverse link, and the reverse link is made to an AP (step 162) or to a BS (step 163). Thus, if a user of a WTRU 71 wishes to upload an image, the request is for a connection and for a connection suitable for uploading an image, such as "hot spot" 74 (FIG. 3). In the case of services provided in response to a remote request (step 134), the request for services can include the preferred type of link, or the preferred type of link can be determined at the transmission end. Thus, if the user of a WTRU 71 requests a data file, the request for particular communication services can be made by the WTRU 71 or at a base station 91 (FIG. 3). Since the preferred type of service is often inherent in the type of user data to be carried, the basic information for selecting a communication protocol is inherent in the request for services.

Figure 5:
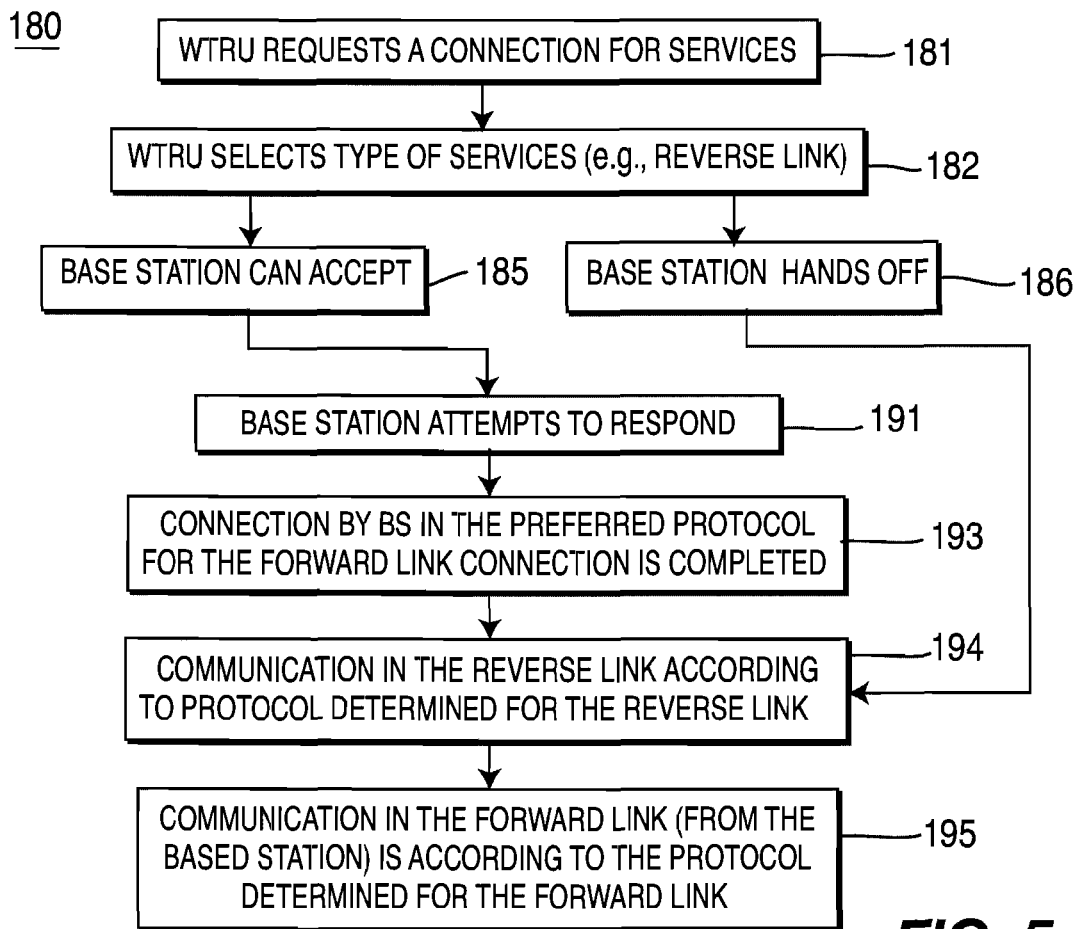
FIG. 5 is a flow diagram of a configuration in which forward and reverse links are established independently.

FIG. 5 is a flow diagram 180 showing an embodiment of the invention, in which forward and reverse links are established independently. If the WTRU (15, 41 or 71) requests a connection for services (step 181), then the selection (step 182) of the type of service, which is in this case the reverse link, is made by the WTRU (15, 41 or 71). The receiving base station can accept (step 185) this request or hand off the request to a different service (step 186). During this stage, the base station attempts to respond (step 191) to the WTRU (15, 41 or 71) in a transmission protocol deemed optimum for the type of service requested by the WTRU (15, 41 or 71). This can be as requested by the WTRU (15, 41 or 71) or according to criteria established at the base station or radio network controller (RNC). The response to the connection by the base station is in the preferred protocol for the forward link except as necessary for signal control of the reverse link. When the connection is completed (step 193), communication in the reverse link (from the WTRU 15, 41 or 71) is according to the protocol determined for the reverse link (step 194), and communication in the forward link (from the base station) is according to the protocol determined for the forward link (step 195).

It is understood that most or all of the control functions used for the respective links which require two way communication would be handled by the same link, so that the control signals related to the reverse link are sent in the forward link direction for such things as power control and similar signal administrative functions. The separate forward link communications would be used for the service being provided (voice or other user data).

The optimal communications protocols may be either determined by the system or determined by the user or a combination of both. For example, the user may elect to communicate with voice services over a particular protocol. Normally voice communications is performed preferentially by a communications protocol optimized for voice; however it may be the case that the user may deem voice on a channel optimized for data is more desirable for one reason or other. Likewise, the user may anticipate transfer of user data of a certain type. It is possible to provide user selection of a preferred protocol in one direction, while allowing the wireless network to select an optimal connection in the other direction. In this way, the user has the advantages of user selection of protocols, while retaining the advantages of system selection of protocols.

Figure 6:
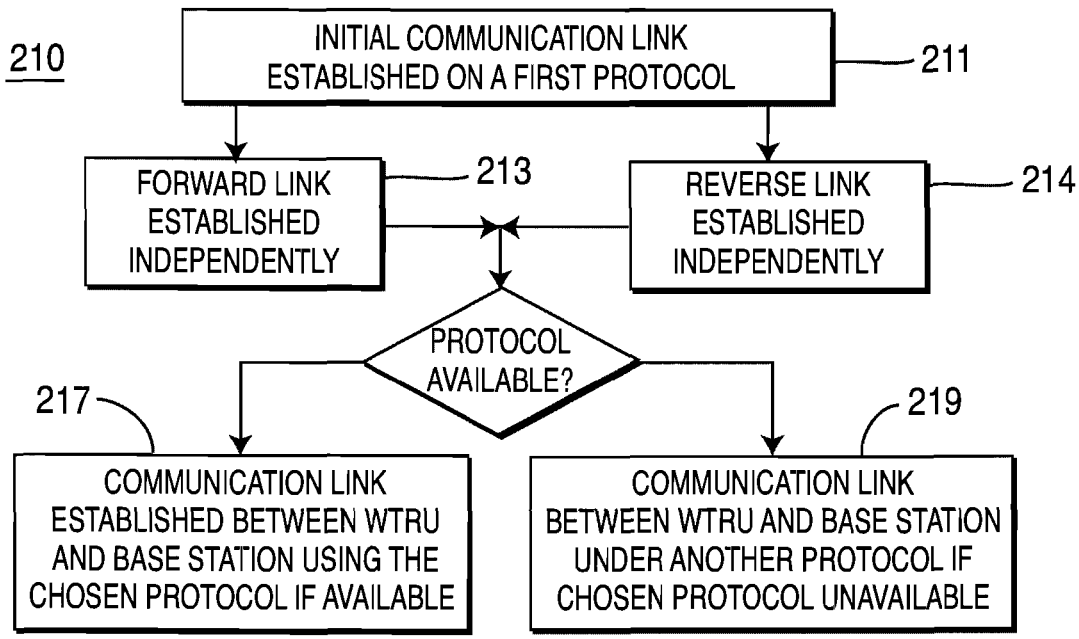
FIG. 6 is a flow diagram showing forward and reverse links established independently after an initial communication link is established on a first protocol.

FIG. 6 is a flow diagram 210 showing another embodiment of the invention. An initial communication link is established on a first protocol (step 211). Forward and reverse links are established independently (steps 213 and 214), but only after the initial communication link is established on a first protocol. Thus, the requesting device, given as the WTRU in this example, makes its data request in a protocol which is deemed by the WTRU as optimal for its transmissions. The communication link is established between the WTRU and the base station (step 217) using the chosen protocol if available or another protocol (step 219) if the chosen protocol is unavailable. The selection of protocols is effected in accordance with prior art techniques for multi-mode communications devices, with the exception that the optimal protocol for reception is deemed unimportant. The decision (step 213 or 214) regarding the optimal protocol for reception is deferred until the connection is established.

Figure 7:
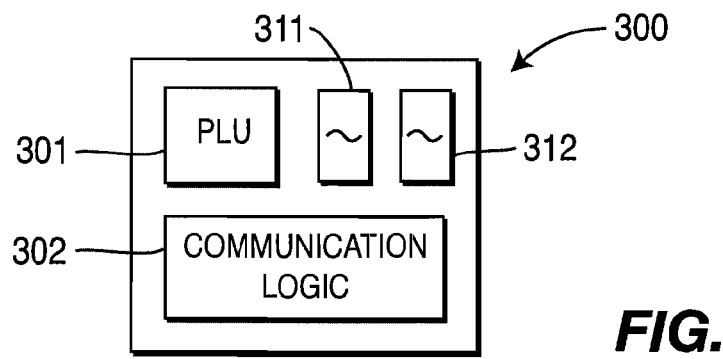
FIG. 7 is a schematic block diagram of a semiconductor integrated circuit (IC) implementing the functions of FIGS. 4-6.

The embodiments of FIGS. 4-6 are implemented in software, firmware, or as a configuration for a semiconductor integrated circuit (IC) chip 300, as shown in FIG. 7. One such implementation would include a programmable logic unit 301 controlling a communication logic module 302. The communication logic module 301 controls plural signal logic modules 311, 312 in order to provide the communication links described in connection with FIGS. 4-6. While a programmable logic unit 301 is shown, it is understood that the logic function can be executed through external programming, either through a separate IC chip or other technique for implementing programmed commands.

While it is likely that the initial communication request would specify a communication protocol which corresponds to predetermined preferences for the direction of the communication link (forward or reverse) of the request, it is also possible to select the initial communication link according to an anticipated optimum for the opposite direction of the communication link request. For example, if the request is a request for a file download, the selection of the initial communication link may be optimal for the opposite direction, meaning the direction of download. The negotiation of an optimal connection in the direction of the request can follow the establishment of the initial link.

Alternately, an initial communication link is established (step 211) in accordance with predetermined protocols for a two-way link. Thus, if the system initiates all communications preferentially under a particular protocol, the initial communication link will be made with a preference for that protocol. If the system relies on user selection of an initial protocol, that will be the preferred initial protocol. If the system makes an initial determination of the type of communication to be made and selects the protocol accordingly for single protocol connections, that selected protocol will be preferred as the initial protocol. By "preferred", it is understood that many systems will select a communication protocol according to a preferred list, such as a "preferred roaming list" (PRL) or other technique for selection. Subsequent to establishing the initial communication link, the uplink and downlink are separately assigned to optimal protocols.

What is claimed is:

1. A wireless transmit/receive unit (WTRU) configured to communicate using a plurality of network protocols, the WTRU comprising:
a circuit configured to make an initial communication request;
a communication circuit configured to establish a communication link in response to the initial communication request in a first direction of communication and a second direction of communication;
a circuit configured to determine a protocol preference for the first direction of communication and further configured to establish communication in the first direction according to the protocol preference separately from communication in the second direction of communication;
a circuit configured to determine a protocol preference for the second direction of communication and further configured to establish communication in the second direction according to the protocol preference separately from communication in the first direction of communication; and
a second circuit configured to determine the availability of communication services optimal for communicating user data in a different protocol from the protocol used as the communication link.

2. The WTRU of claim 1, wherein the communication circuit is further configured to to establish the communication link according to a protocol preference for the direction of communication corresponding to the initial communication request.

3. The WTRU of claim 1, wherein the communication circuit is further configured to establish the communication link according to a predetermined protocol preference.

4. The WTRU of claim 1, wherein the communication circuit is further configured to to establish a communication link according to a protocol of the communication services optimal for communicating the user data in a link direction for the communication of user data.

5. A semiconductor integrated circuit (IC) chip, configured to control a wireless communication device for establishing communication links according to plural protocols, comprising:
a circuit configured to make a communication request according to predetermined criteria;
a circuit configured to establish an initial communication link responsive to the communication request;
a circuit configured to determine a preferred communication protocol in at least one of a forward or reverse link direction; and
a circuit configured to establish the communication link for the at least one of a forward or reverse link direction in accordance with the preferred communication protocol while controlling communication in the other direction independently.

6. The semiconductor IC chip of claim 5, wherein:
the circuit configured to establish the initial communication link is further configured to establish the initial communication link according to a protocol preference for the direction of communication corresponding to the initial communication request.

7. The semiconductor IC chip of claim 5, further comprising:
a circuit configured to determine a service for communication;
a circuit configured to establish communication in a first direction according to a predetermined protocol preference for the first direction; and
a circuit configured to establish communication in a second direction according to a predetermined protocol preference for the second direction.

8. The semiconductor IC chip of claim 5, further comprising:
a circuit configured to determine a preferred communication protocol in the first direction of communication; and
a circuit configured to determine a preferred communication protocol in the second direction of communication.

9. A method for use in a wireless transmit/receive unit (WTRU), the method comprising:
establishing a communication request according to predetermined criteria;
establishing an initial communication link responsive to the communication request;
determining a preferred communication protocol in at least one of a forward or reverse link direction; and
establishing the communication link for the at least one of a forward or reverse link direction in accordance with the preferred communication protocol while controlling communication in the other direction independently.

10. The method of claim 9, further comprising:
establishing the initial communication link according to a protocol preference for the direction of communication corresponding to the initial communication request.

11. The method of claim 9, further comprising:
determining a service for communication;
establishing communication in a first direction according to a predetermined protocol preference for the first direction; and
establishing communication in a second direction according to a predetermined protocol preference for the second direction.

12. The method of claim 9, further comprising:
determining a preferred communication protocol in the first direction of communication; and
determining a preferred communication protocol in the second direction of communication.

* * * * *